M. W. RUSSELL.
MOLE TRAP.
APPLICATION FILED JAN. 21, 1914.
1,135,052.
Patented Apr. 13, 1915.
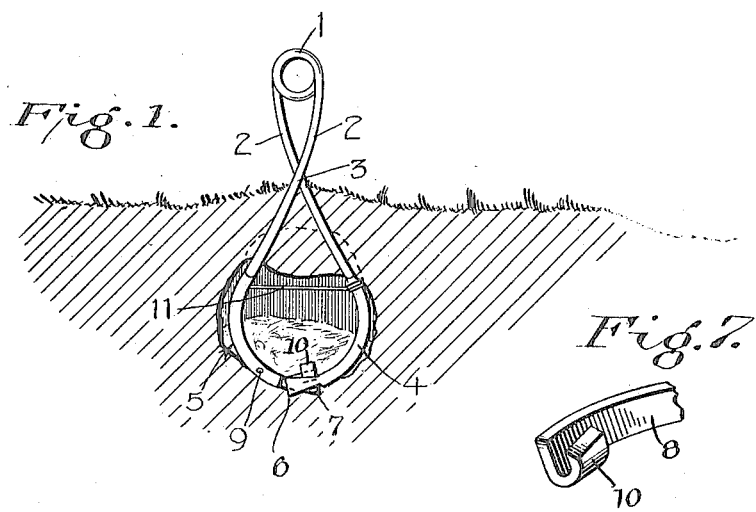
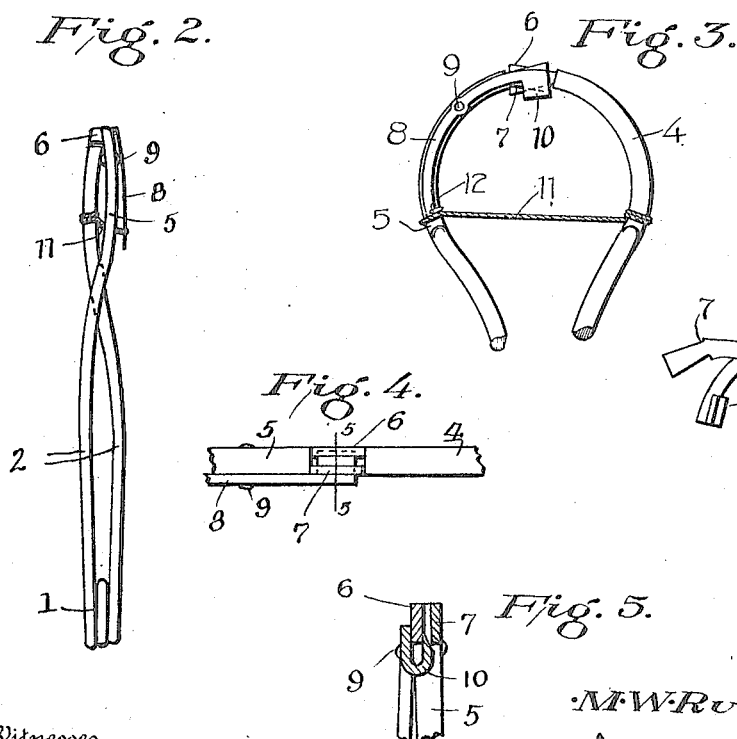
Witnesses
C. V. P. Newbold
Inventor
M. W. Russell
By ...... Jr.
Attorney

UNITED STATES PATENT OFFICE.

MANNING W. RUSSELL, OF KEITHVILLE, LOUISIANA.

MOLE-TRAP.

1,135,052.  Specification of Letters Patent.  Patented Apr. 13, 1915.

Application filed January 21, 1914. Serial No. 813,423.

*To all whom it may concern:*

Be it known that I, MANNING W. RUSSELL, a citizen of the United States, residing at Keithville, in the parish of Caddo and State of Louisiana, have invented certain new and useful Improvements in Mole-Traps; and I do hereby declare the following to be a full, clear, and exact description of the invention, such as will enable others skilled in the art to which it appertains to make and use the same.

This invention relates to mole traps, and one of the principal objects of the invention is to provide a trap of simple construction, which can be manufactured at low cost and which will be reliable and efficient in use.

Another object of the invention is to provide a spring mole trap made from a single piece of spring wire of the desired gage, said trap being provided with a trigger constructed and arranged to be operated by the mole in passing through the run.

These and other objects may be attained by means of the construction illustrated in the accompanying drawing, in which, Figure 1 is a view in side elevation showing the trap set in the run of a mole. Fig. 2 is an edge view of the trap removed from the run and in set condition. Fig. 3 is a view showing the two spring jaws of the trap set. Fig. 4 is a top plan view of the jaws and trigger, said jaws being set in position as shown in Fig. 3. Fig. 5 is a detail sectional view taken on the line 5—5 of Fig. 4. Fig. 6 is a side elevation of the jaws of the trap sprung.

Referring to the drawing, the numeral 1 designates a plurality of coils formed in the center of a strand of wire of the required gage, and said wire being resilient or springy. From the coils 1 the members 2 are crossed as at 3 and extended to form the jaws 4 and 5. The members 4 and 5 are flat and at the terminal end of the jaw member 4 is a flat angular catch 6 designed to engage a shoulder 7 on the member 5 when the trap is set. The normal tension of the spring of the trap is exerted to spring the trap and close the jaws to the position shown in Fig. 6 of the drawing. A trigger 8 is pivoted to the jaw member 5 at 9, and said trigger is provided with a wedge-shaped finger 10. Connected to the member 4 is a flexible cord or chain 11 and the opposite end of said cord or chain is connected to the trigger at 12.

In setting the trap, a spade or paddle is inserted across the run of the mole and when the spade or paddle is removed the trap is inserted to take its place. The natural tension of the spring is such that when the portion 6 is engaged with the shoulder 7, it will normally remain in this position and hold the jaws apart. The cord 11 connected to the trigger extends across the top of the run of the mole as shown in Fig. 1, and a slight movement of this cord, such as would be made by the mole in passing through the run would move the wedge-shaped portion 10 of the trigger between the members 6 and 7 to release the same and to spring the trap.

From the foregoing it will be obvious that a mole trap made in accordance with this invention can be produced at very low cost, can be quickly set in and across the run of the mole and that the earth can be pressed down and around the same to exclude the light and that the trap will be reliable and efficient in use and cannot readily get out of order.

Certain changes may be made in the details of construction without departing from the spirit and scope of the invention as defined in the claim.

What is claimed is:—

A mole trap comprising a single piece of resilient wire provided with a plurality of coils and said trap having crossed members formed into curved jaws, means for normally holding said jaws separated, a trigger pivoted to one of the said jaws, said trigger having a wedge-shaped finger to separate the jaws, and a flexible connection attached to one of the jaws and to said trigger to be operated by the mole for springing the trap.

In testimony whereof I affix my signature in presence of two witnesses.

MANNING W. RUSSELL.

Witnesses:
 C. H. PEYTON,
 J. R. TOLBERT.